(12) United States Patent
Quittschreiber

(10) Patent No.: US 6,883,783 B1
(45) Date of Patent: Apr. 26, 2005

(54) ELECTRICAL UNDERGROUND WIRE PULLEY TO ASSIST IN PULLING WIRE THROUGH UNDERGROUND CONDUIT

(76) Inventor: Robert G. Quittschreiber, 294 Golden Eagle Bend, Machesney Park, IL (US) 61115

( * ) Notice: Subject to any disclaimer, the term of this patent is extended or adjusted under 35 U.S.C. 154(b) by 0 days.

(21) Appl. No.: 10/652,222

(22) Filed: Aug. 29, 2003

(51) Int. Cl.[7] .................................................. B21F 9/00
(52) U.S. Cl. .............................. 254/262; 254/134.3 R; 254/134.3 FT; 254/134.3 PA
(58) Field of Search ................................ 254/199, 262, 254/134.3 R, 134.3 FT, 134.3 PA

(56) References Cited

U.S. PATENT DOCUMENTS

| | | | |
|---|---|---|---|
| 2,948,510 A | 8/1960 | Kieser | |
| 3,072,382 A | 1/1963 | Jones | |
| 3,072,383 A | 1/1963 | Vanderhagen | |
| 3,190,616 A | 6/1965 | Oleson | |
| 3,201,090 A * | 8/1965 | Jones | 254/134.3 FT |
| 3,343,809 A * | 9/1967 | Newell | 254/134.3 FT |
| 4,033,551 A | 7/1977 | Lindstrom | |
| 4,202,530 A * | 5/1980 | Conti | 254/134.3 FT |
| 4,270,734 A | 6/1981 | Straight | |
| 4,565,351 A * | 1/1986 | Conti et al. | 254/134.3 FT |
| 4,582,297 A | 4/1986 | Conti | |
| 4,635,875 A | 1/1987 | Apple | |
| 4,899,988 A | 2/1990 | Mills | |
| 5,029,816 A * | 7/1991 | Langston | 254/134.3 FT |
| 5,236,177 A * | 8/1993 | Tamm | 254/134.3 FT |
| 5,388,781 A | 2/1995 | Sauber | |
| 5,516,080 A * | 5/1996 | McVaugh | 254/134.3 FT |
| 5,664,765 A | 9/1997 | Pickrell | |
| 6,283,450 B1 | 9/2001 | Viola | |
| 6,682,051 B2 * | 1/2004 | Sigrist | 254/134.3 R |

* cited by examiner

Primary Examiner—Emmanuel Marcelo
(74) Attorney, Agent, or Firm—Keith Frantz

(57) ABSTRACT

An electrical underground wire pulley for pulling wire through conduit having an opening in a base structure that is provided with pre-installed anchor bolts. The wire pulley includes a frame with a bottom adapter plate and a pair of side supports extending upwardly from the adapter plate. The adapter plate includes an opening through which the top of the conduit extends, and a set of four slots through which the anchor bolts extend for securing the wire pulley to the base. The slots are equally spaced from one another and extend lengthwise at 90 degrees radially outwardly from the conduit opening to accept anchor bolt patterns of different size. A pulley is rotatably supported between the side supports above and offset behind from the center of the conduit to assist in pulling wire through the conduit.

9 Claims, 6 Drawing Sheets

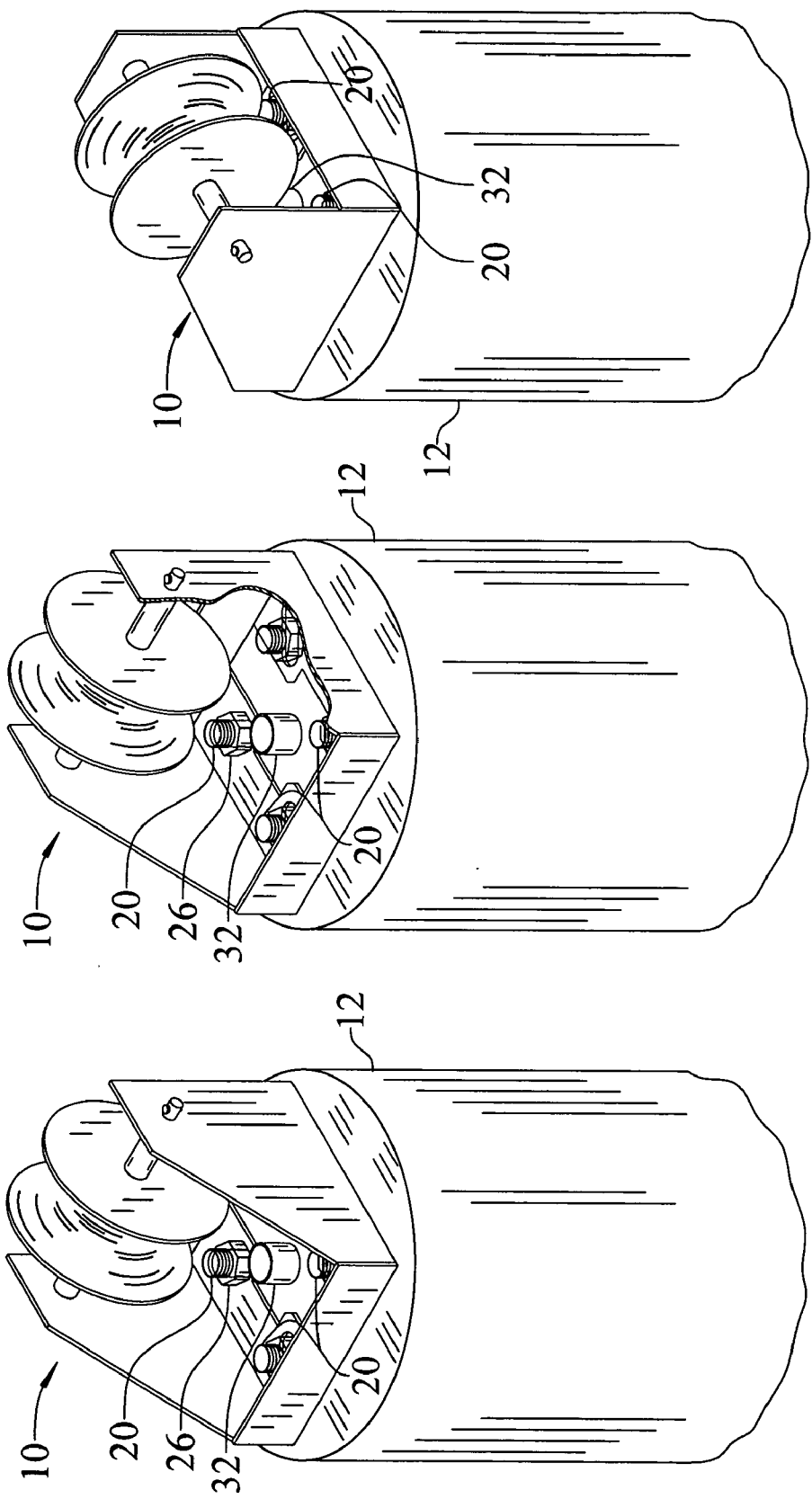

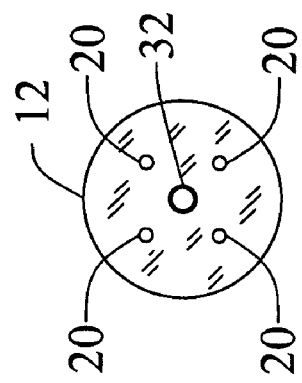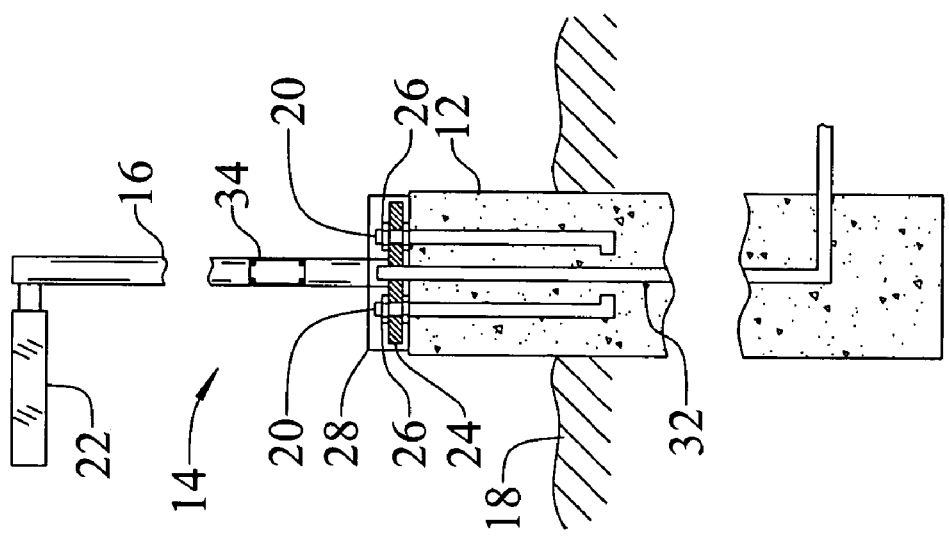

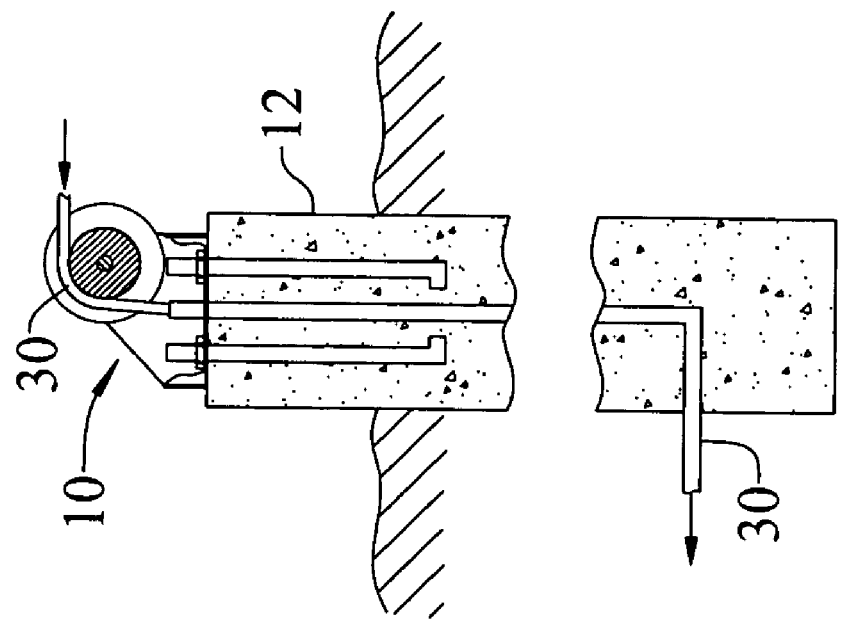
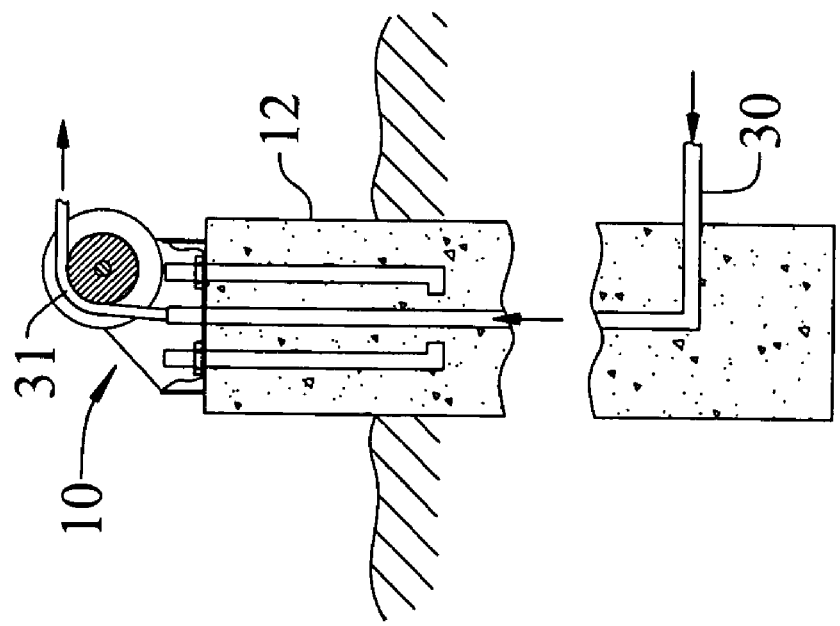
FIG. 12

US 6,883,783 B1

ELECTRICAL UNDERGROUND WIRE PULLEY TO ASSIST IN PULLING WIRE THROUGH UNDERGROUND CONDUIT

CROSS-REFERENCES TO RELATED APPLICATIONS

None.

REFERENCE TO SEQUENCE LISTING, TABLE, OR COMPUTER PROGRAM LISTING APPENDIX SUBMITTED ON A COMPACT DISC

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates generally to a device to assist in pulling electrical wire through underground conduit.

More particularly, the invention relates to an electrical underground wire pulley which, while suitable and adaptable for other uses, is specially adapted to assist in pulling electrical wire through underground conduit between concrete base structures of the type used with light poles and some outdoor electric signs.

2. Description of Prior Art

A typical parking lot light, street light, and some electric signs, include a concrete base that is set into the ground, and a pole secured to the base with four nuts threaded onto threaded studs, commonly referred to as anchor bolts, that are anchored into the base. Electrical wire is run to the base through underground conduit, the pole is secured to the base, and electrical connections are made through an access panel in the side of the pole.

The conventional technique to pull electrical wire through underground conduit is to first thread a thin rope or starter cable through the conduit, connect one end of the starter cable to the electrical wire, and then pull the starter cable and electrical wire back through the conduit until sufficient length of the wire extends out the end of the conduit to make the electrical connections in the pole.

In many instances, such as commonly encountered between parking lot lights, the electrical wire is pulled manually through the conduit. However, manually pulling electrical wire through the underground conduit can be difficult due to friction between the conduit and the wire, particularly as the length of the conduit increases, as the clearance between the wire and the conduit decreases, and if the wire is supplied or pulled at a significant angle that is not perpendicular to the conduit opening, all of which increase the friction between the wire and the conduit. Due the high pulling forces that may be required, this manual technique also presents the possibility of accidents and injury to the persons pulling the wire. The conventional configuration of parking lot lights further complicates pulling wire through the conduit. The concrete base of a parking lot light is typically extends to a height of 2 to 3 feet above ground. This height adds to the difficulties and dangers of manually supplying wire into and pulling wire through the conduit. If standing on the ground, the installer can achieve only limited leverage with which to pull the wire, and standing on the top of the base, for additional leverage, creates obvious hazardous conditions. Such manual operations also present the potential for damage to the wire due to sharp bends that may accidentally develop in the wire while supplying the wire into the conduit.

Specially adapted trucks or other relatively large, specialty equipment is sometimes used to pull cable through underground conduit, particularly through long lengths of conduit as may encountered between street lights. However, the relatively high cost associated with the purchase, maintenance and use of such equipment typically precludes its economical use in many instances and to smaller contractors. Certain prior portable, less expensive pulley devices are known in the art to assist in pulling wire through conduit. However, none of these known devices are particularly suitable to assist in pulling wire through conduit between concrete base structures of the subject type. Consequently, pulleys designed for different purposes are sometimes used in make-shift arrangements, such as suspending a pulley on a chain from the boom of a bucket truck, or otherwise rigging a pulley above the conduit, to enable manually supplying the wire and pulling the wire either manually or with a motor vehicle. Such arrangements can be difficult and time consuming to setup and use, and they remove the equipment from the use for which it was intended. Further, if not setup and used carefully, such make-shift arrangements can also create unsafe working conditions and the possibility of injury.

Consequently, there is a need for an improved device to address the above-noted drawbacks and disadvantages of the prior methods and apparatus to pull wire through underground conduit. In particular, there is a need for a new and improved device that is specially adapted to assist in pulling wire through underground conduit to or between base structures of the subject type, and that is, among other things, cost effective in fabrication and use, easy to setup and use, easy to transport from one base structure to another, and promotes user safety by eliminating the dangers associated with manual unassisted pulling of wire through underground conduit and previously used make-shift pulley arrangements.

SUMMARY OF THE INVENTION

The general aim of the present invention is to provide a new and improved device to assist in pulling wire through underground conduit to and between concrete base structures of the subject type commonly associated with light poles and some electric signs.

A detailed objective of the invention is to achieve the foregoing by providing a device that is specially adapted to be secured to the anchor bolts installed into the concrete base structures, and to secure a pulley in position above the conduit to assist in supplying wire into and pulling wire through the conduit.

Another detailed objective of the invention is to provide a device that assists in reducing the friction when pulling wire through conduit, thus providing for enhanced ease of installation of the wire and resulting in reduced manpower requirements and labor cost savings.

Yet another detailed objective of the invention is to provide a portable device that reduces the friction and eliminates sharp bends in the wire when supplying and pulling wire through underground conduit, thereby simultaneously reducing the likelihood of damage to the wire.

Still another objective of the invention is to achieve the foregoing in a portable device that reduces the possibility of injury while pulling the wire through the conduit.

These and other objectives and advantages of the invention will become more apparent from the following detailed description when taken in conjunction with the accompanying drawings.

Briefly, an electrical underground wire pulley in accordance with the invention includes a frame with a bottom universal adapter plate that is provided with an opening for the conduit, and a set of four slots equally angularly spaced about the conduit opening to receive the anchor bolts, the slots extending at 90 degrees from one another in a direction radially outwardly from the conduit opening. The frame further includes a pair of side supports, and a pulley rotatably carried between the side supports on a shaft for free rotation about a horizontal axis. The pulley is positioned above and behind the conduit opening, and the curvature of the pulley is positioned approximately vertically aligned with the adjacent side of the conduit when the wire pulley is installed onto the base structure.

BRIEF DESCRIPTION OF THE DRAWINGS

FIG. 1 is a front perspective view of an electrical underground wire pulley in accordance with the invention, the wire pulley being shown secured to the concrete base of a light to assist in pulling electrical wire through conduit in the base.

FIG. 2 is a view similar to FIG. 1 but with a portion of the side of the wire pulley broken away.

FIG. 3 is a back perspective view of the wire pulley shown in FIG. 1.

FIG. 4 is a fragmentary side cross-sectional view of a typical parking lot light.

FIG. 5 is a top view of the concrete base structure of a light shown in FIG. 4.

FIG. 12 is a fragmentary side cross-sectional view of illustrating use of the wire pulley to assist in supplying wire into one light pole base and pulling wire through an underground conduit to a second light pole base.

Figure 7:
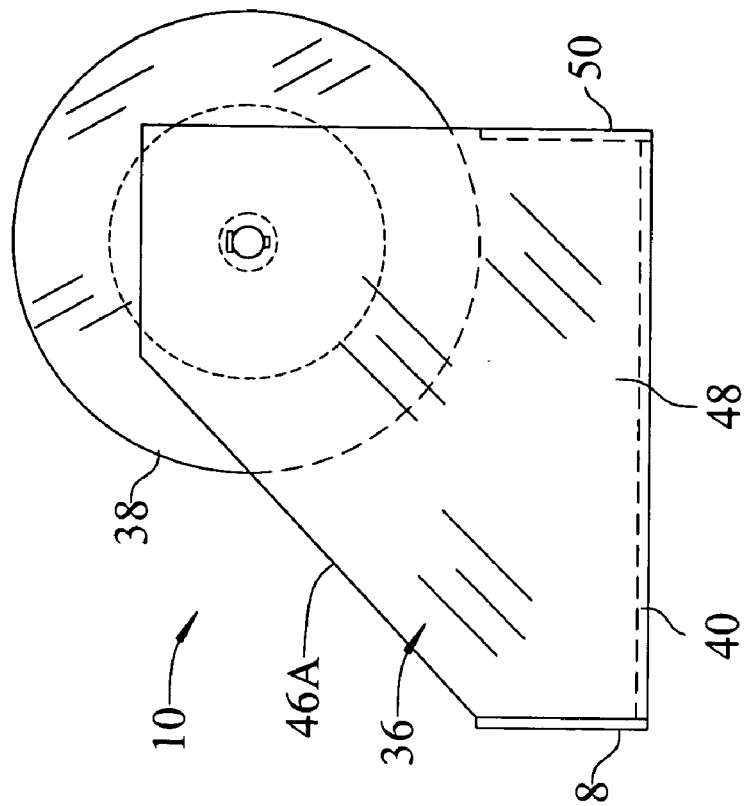
FIG. 7 is a side view of the wire pulley, the opposite side view being a mirror image thereof.
Figure 6:
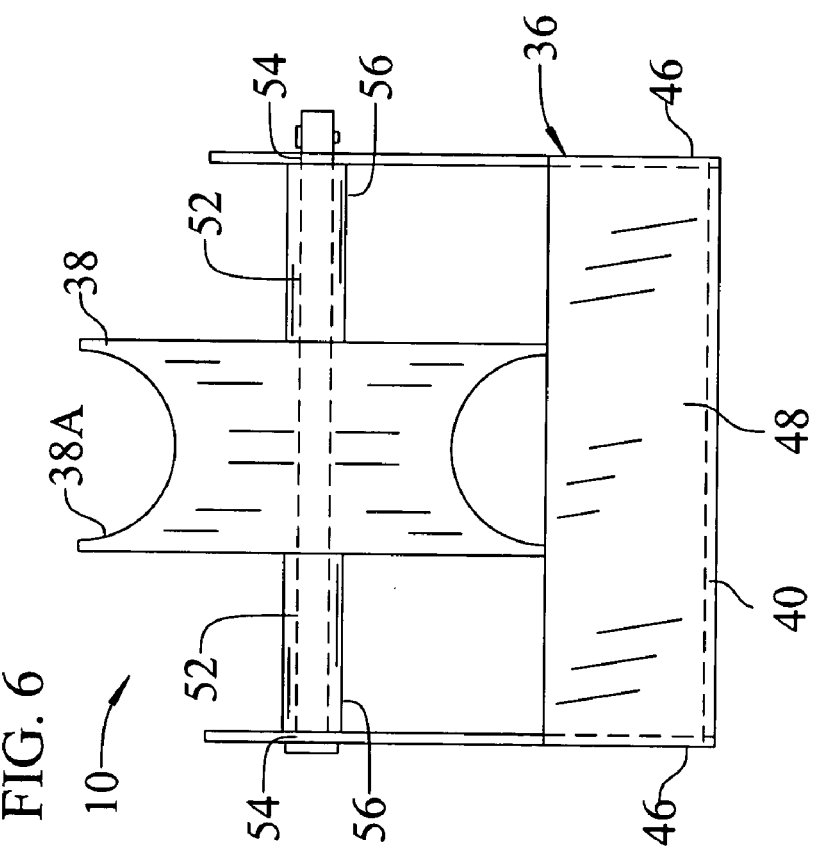
FIG. 6 is a front view of the wire pulley, the back view being a mirror image thereof.

Reference numerals in the drawings correspond to the following:

10—electrical underground wire pulley
12—concrete base
14—parking lot light
16—light pole
18—ground
20—anchor bolts (threaded studs)
22—light fixture
24—flange
26—threaded nuts
28—flange cover
30—electrical wire
31—starter cable
32—underground conduit
34—access panel
36—frame
38—pulley
38A—pulley curvature
40—universal adapter plate
40A—bottom plate section
40B—bottom plate section
40C—cutouts
42—clearance opening for conduit
44—clearance slots for anchor bolts
46—side supports
46A—angled side edges
48—front plate
50—back plate
52—shaft
54—shaft support openings
56—spacers While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

The present invention relates to a pulley device for use in pulling electrical wire, optical cable, and other wire or cable through underground conduit extending through a base structure having pre-installed anchor bolts such as commonly used with street lights, parking lot lights, and certain outdoor electrical signs.

Referring to FIGS. 1–3, the present invention is shown in the drawings as electrical underground wire pulley 10 adapted to assist in supplying electrical wire into and pulling wire through conduit 32 in the concrete base 12 of a parking lot light 14 (FIG. 4).

The light 14 shown is a conventional type parking lot light with a light pole 16 and the concrete base 12 that is set in and extends 2 to 3 feet above the ground 18. Four threaded studs or anchor bolts 20 (FIGS. 4–5) are anchored in and extend above the top of the concrete base. The light pole includes a light fixture 22 mounted near the top of the pole, and a flange 24 connected at the base of the pole. The flange is provided with a bolt hole pattern matching the location of the anchor bolts, and is secured to the top of the base with threaded nuts 26 tightened onto the anchor bolts. An optional cover 28 is secured to the top of the base over the flange and anchor bolts.

Electrical wire 30 is run to the light 14 through underground conduit 32 that extends upwardly through the center of the base and a few inches above the top surface of the base. During construction of the light, the wire is typically pulled through the conduit from the base of a second light pole location prior to securing the light pole to the base. Electrical connections in the finished light are made in the pole behind the access panel 34.

In accordance with one aspect of the invention, the electrical underground wire pulley 10 mounts securely to the anchor bolts 20 that are pre-installed into the top of the concrete base 12 through which the wire is to be pulled. The wire pulley provides the user with additional leverage with which to pull the wire through the conduit, and guides the starter cable as it exits the conduit to reduce the friction of pulling the wire through the conduit. When pulling wire from one concrete base to another, a second wire pulley 10 may be used to assist in guiding the wire into the conduit. Accordingly, when pulling wire between two concrete bases 12, two wire pulleys 10 are used in preferred methods in accordance with the invention, one wire pulley being secured to the top of each light pole base.

As shown in detail in FIGS. 6–9, the electrical underground wire pulley 10 includes a frame support structure 36 and a pulley 38. The frame includes a bottom universal adapter plate 40 that rests on the top surface of the concrete base 12 and is secured thereto with threaded nuts 26 tightened onto the pre-installed anchor bolts 20. The adapter plate is provided with a generally center clearance opening 42 through which the top of the conduit projects (see e.g., FIG. 10), and a set of clearance slots 44 for the threaded studs 20 to extend through. The slots are equally angularly spaced at 90 degrees from one another, symmetric about the conduit opening 42, extend lengthwise at 90 degrees from one another in a direction radially outwardly from the conduit clearance opening, and are sized to accept a range of anchor bolt patterns such as commonly used in parking lot lights. In preferred embodiments, the slots are sized to receive studs set at 90 degrees apart on bolt circle diameters between approximately 7 to 14 inches. As a result, the adapter plate enables the electrical underground wire pulley 10 to be used with lights having different anchor bolt patterns, and with other wire or cable-supplied structures of the same general type. In the embodiment shown, the universal adapter plate is established with two bottom plate sections 40A, 40B that are mirror images of each other (see FIGS. 8–9), that are equally spaced on either side of the conduit location, that include complimentary cutouts 40C to establish the conduit clearance opening 42, and that each include a pair of the clearance slots 44 for the studs. In this instance, the frame includes front and back frame elements connecting the bottom plate sections 40A, 40B in fixed structural relation, such as the front plate 48 and back plate 50 shown.

The frame 36 further includes a pair of side supports 46 that extend upwardly from the universal adapter plate 40, on opposite sides of the conduit opening 42, to support a relatively large pulley 38 at a position above and behind the conduit opening. The sides may be provided as in the plate form shown, in a post form, or any other convenient configuration to support the pulley. However, in preferred embodiments, the sides and/or front and back of the frame are configured for access to the inside of the frame, for ease of reaching the conduit opening and the anchor bolts, and securing the wire pulley 10 thereto with the threaded nut 26. Such access may be conveniently established with openings, clearance areas, reduced height structure, as compared to the height of the side locations supporting the pulley, or other absence of impeding structure in the frame. In the embodiment shown, access to inside the frame is provided with low profile front and back plates, and side plates that are mirror images of each other with front portions having upper edges 46A that angle downwardly upon progressing from the pulley support locations towards the front of the frame. The frame shown includes bottom, sides, front and back constructed from ¼ inch thick metal plate, but the frame elements may be fabricated from other suitable material and thickness as desired.

Figure 9:
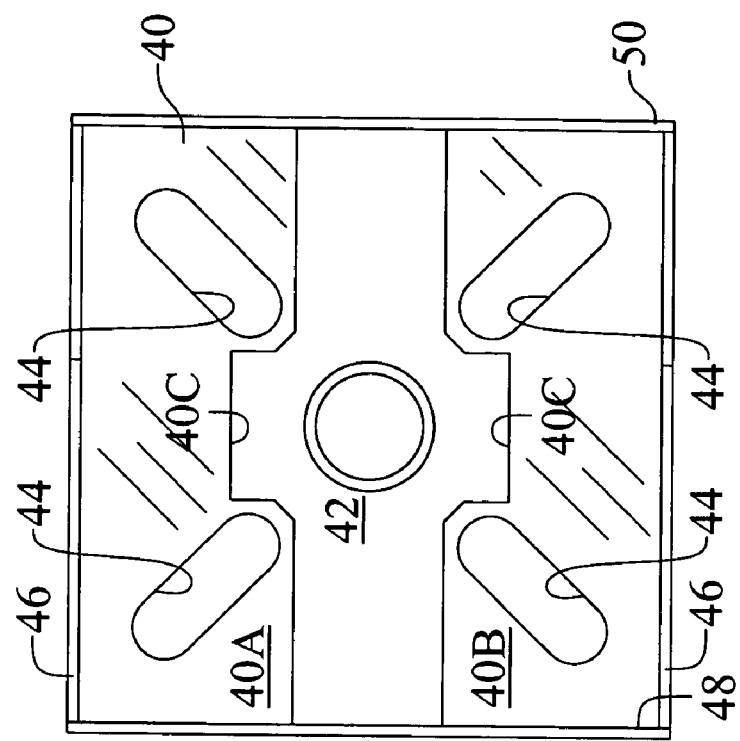
FIG. 9 is a top view similar to FIG. 8 but with certain parts not shown to expose additional aspects of the wire pulley.
Figure 8:
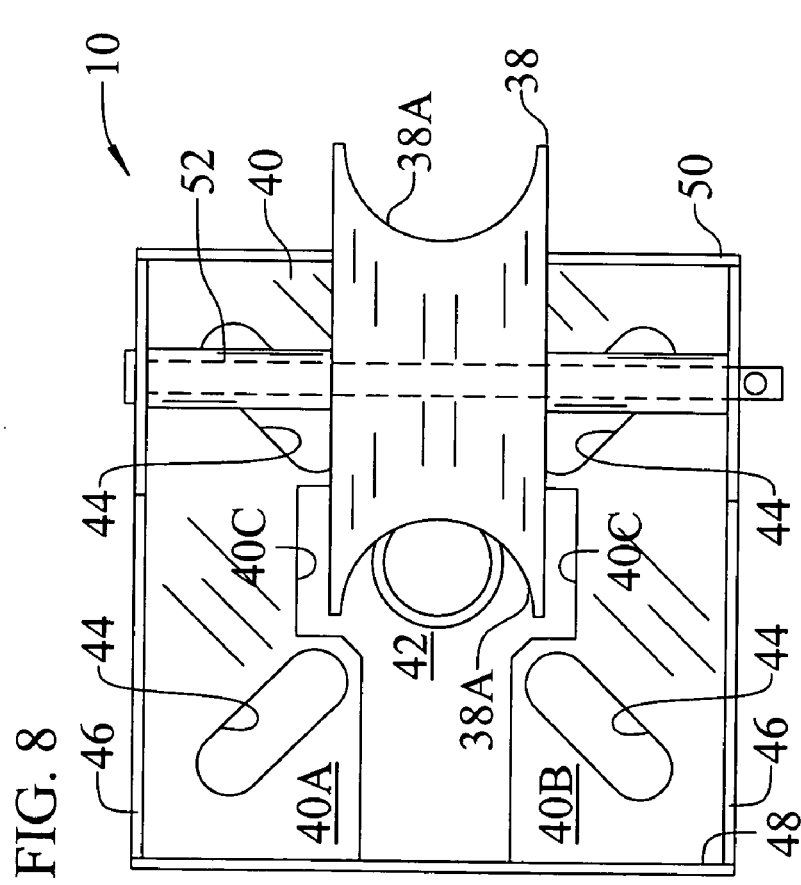
FIG. 8 is a top view of the wire pulley.
Figure 11:
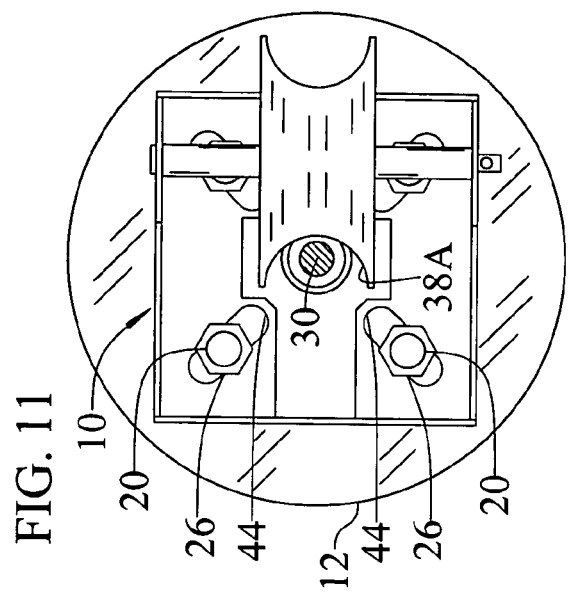
FIG. 11 is a top view of the wire pulley and base.
Figure 10:
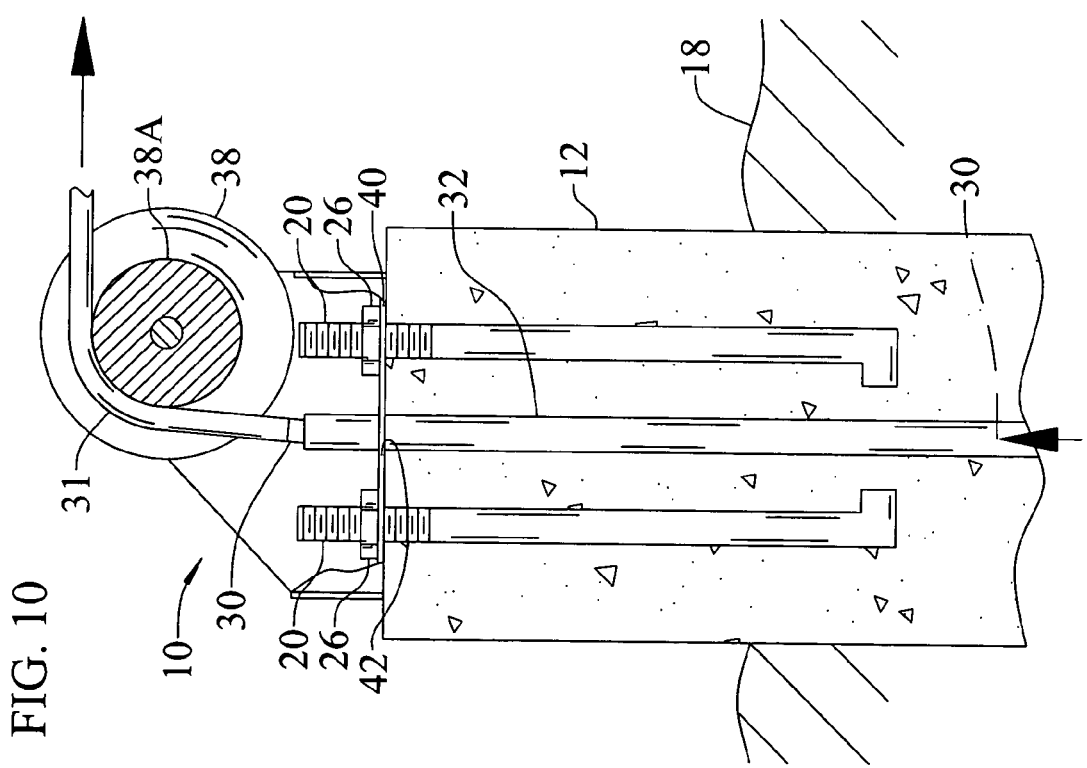
FIG. 10 is a fragmentary side view showing the wire pulley being used to pull wire through the base.

The pulley 38 is supported on a shaft 52 carried between the sides 46 of the frame 36. The pulley is rotatably supported either on the fixed shaft, or on a shaft that is rotatably supported such as in bearings, bushings or openings 54 in the sides of the frame. In the embodiment shown, a pair of annular spacers 56 are located on each side between the pulley and the sides of the frame surrounding the shaft. The spacers maintain the pulley at a predetermined side-to-side location on the shaft, generally centered over and behind the cutouts 40C in the bottom of the frame as shown in FIGS. 8 and 9, and therefore centered from side-to-side aligned with the conduit 36. Alternate arrangements may be utilized to position the rotatable shaft in the frame, such as, for example, a pair of rings secured with set screws may be provided on each side of the shaft. The front-to-back position of the pulley and the diameter of the pulley are established, in cooperation with the front-to-back location of the shaft, to position the radius curvature 38A of the pulley approximately vertically aligned with the adjacent or back side of the conduit when the wire pulley is installed onto the concrete base 12. As a result, the pulley is positioned so that the wire will preferably not contact the top, inside opening of the conduit when supplied around the pulley and into the conduit or when drawn up from the conduit (see FIG. 10).

In use, the electrical underground wire pulley 10 is first secured in position to the anchor bolts on the top of a concrete base 12 with threaded nuts 26. The starter cable is threaded through the conduit and connected to the wire supply. The wire 30 is then pulled through the conduit, by pulling the starter cable 31 approximately straight up and around the pulley, towards the side of the pulley opposite the center location of the conduit, until the end of the wire extends out the end of the conduit. In the view shown in FIG. 10, the starter cable is pulled up, over the top of the pulley and to the right. After the wire has been pulled through the conduit, the wire pulley is removed from the base, and installation of the light pole proceeds normally. When used to pull wire through conduit from one concrete base to another, a wire pulley is secured to each base. As shown in FIG. 12, one wire pulley is used at the location of the wire supply to assist in guiding the wire into the conduit, and a second wire pulley is used at the destination base to pull the starter cable and wire through the conduit. From the foregoing, it will be apparent that the present invention brings to the art a new and improved electrical underground wire pulley to assist in safely and more easily pulling wire or cable through underground conduit such as located between parking lot lights, street lights, and other structures as described above, as compared with prior methods, while providing additional protection to the integrity of the wire. The wire pulley assists the user in pulling wire through the conduit in several ways. The position of the pulley maintains the wire in a generally vertical orientation as it enters and exits the conduit, thereby eliminating or reducing the friction on the wire. The wire pulley turns the wire for feeding and the starter cable for pulling in generally horizontal directions, as opposed to conventional manual techniques in which the wire is feed and pulled in generally vertically directions to minimize friction, by pulling the wire over the rotatable, low friction pulley. Pulling horizontally enables the installer to achieve enhanced traction, and alternately enables the wire to be pulled by a motor vehicle. The curvature of the pulley protects the insulation on the wire as it is feed into the conduit, by preventing the possibility of sharp bends in the wire may occur with manually feeding the wire into the conduit. Accordingly, the electrical underground wire pulley is an economical and portable device that permits pulling electrical wire and cable through an underground conduit more safely and easily than conventional manual techniques and prior make-shift pulley arrangements.

I claim:

1. An electrical underground wire pulley for pulling wire through an underground conduit exiting through the top of a base structure having pre-installed anchor bolts spaced at 90 degrees surrounding the conduit, the electrical underground wire pulley comprising:
   a) a frame having a front, a back and opposing sides, the frame being established with;
      i) a bottom universal adapter plate provided with;
         (a) an opening for the conduit, and
         (b) a set of four slots equally angularly spaced about the conduit opening to receive the anchor bolts for securing of the wire pulley onto the base structure therewith, the slots extending lengthwise at 90 degrees from one another in a direction radially outwardly from the conduit opening; and
      ii) a pair of side supports located on said opposing sides and extending upwardly from the adapter plate;
      at least one of the front, the back and the sides of the frame being configured to provide access to the opening and the slots from outside the frame; and
   b) a pulley rotatably carried between the side supports of the frame for free rotation about a horizontal axis, the pulley being positioned above and generally behind the conduit opening for positioning of the curvature of the pulley approximately vertically aligned with the adjacent side of the conduit when the wire pulley is secured onto the base structure.

2. The electrical underground wire pulley as defined in claim 1 in which the slots are sized to accept the anchor bolts pre-installed on a bolt circle diameter of between approximately 7 to 14 inches.

3. The electrical underground wire pulley as defined in claim 1 in which the front portions of the side supports are provided at a reduced height to establish said access to the opening and the slots.

4. The electrical underground wire pulley as defined in claim 3 in which the front portions of the side supports angle downwardly upon progressing forwardly from the location of the pulley.

5. The electrical underground wire pulley as defined in claim 1 in which the adapter plate includes two plate sections laterally spaced from one another, the plate sections being provided with cutouts that cooperate to define said opening for the conduit and each with a pair of said slots, and the frame further includes front and back frame elements connecting said plate sections together.

6. The electrical underground wire pulley as defined in claim 1 further comprising a centering device to maintain the pulley centered with respect to the opening for the conduit.

7. An electrical underground wire pulley for pulling wire through an underground conduit exiting through the top of a base structure having pre-installed anchor bolts spaced at 90 degrees surrounding the conduit, the electrical underground wire pulley comprising:
   a) a frame having a front, a back and opposing sides, the frame being established with;
      i) a bottom universal adapter plate provided with,
         (a) an opening for the conduit, and
         (b) a set of four slots equally angularly spaced about the conduit opening to receive the anchor bolts for securing of the wire pulley onto the base structure therewith, the slots extending lengthwise at 90 degrees from one another in a direction radially outwardly from the conduit opening, the slots being sized to accept the anchor bolts pre-installed on a bolt circle diameter of between approximately 7 to 14 inches;
      ii) a pair of side support elements located on said opposing sides and extending upwardly from the adapter plate,
      at least one of the front, the back and the sides of the frame being provided at a height less than the height of the side support elements to provide access to the opening and the slots from outside the frame; and
   b) a pulley rotatably carried between the side supports of the frame for free rotation about a horizontal axis, the pulley being positioned above and generally centered behind the conduit opening for positioning of the curvature of the pulley approximately vertically aligned with the adjacent side of the conduit when the wire pulley is secured onto the base structure.

8. A method for pulling wire and cable through an underground conduit having an opening at the top of a base structure, the top of the base structure having four pre-installed anchor bolts generally centered about the conduit and equally spaced at 90 degrees from one another, the method comprising the steps of:
   a) providing:
      i) a frame having a bottom universal adapter plate with an opening to receive the conduit and a set of four slots equally angularly spaced about the conduit opening to receive the anchor bolts, the slots extending lengthwise at 90 degrees from one another in a direction radially outwardly from the conduit opening, the frame further having a pair of side support elements extending upwardly from the adapter plate; and
      ii) a pulley rotatably carried between the side support elements for free rotation about a horizontal axis, the pulley being positioned above and generally centered behind the conduit opening;
   b) positioning the frame and pulley into a position onto the top of the base with the open end of the conduit positioned in the opening in the adapter plate, with the anchor bolts extending through the slots in the adapter plate, and with the curvature of the pulley approximately vertically aligned with the adjacent side of the conduit;
   c) securing the frame and pulley to the anchor bolts in said position; and
   d) threading a starter cable through the conduit, the starter cable having a first end extending through the conduit at the base structure and having a second end connected to the wire; and
   e) pulling the starter cable over and around the pulley to pull the wire through the conduit.

9. The method as defined in claim 8 in which the slots are sized to accept the anchor bolts pre-installed on a bolt circle diameter of between approximately 7 to 14 inches.

* * * * *